US012160502B2

(12) United States Patent
Mudge et al.

(10) Patent No.: US 12,160,502 B2
(45) Date of Patent: *Dec. 3, 2024

(54) WEB DOMAIN CORRELATION HASHING METHOD

(71) Applicant: MORGAN STANLEY SERVICES GROUP INC., New York, NY (US)

(72) Inventors: Eric Mudge, Woodstock, MD (US); Joseph Edmonds, Ellicott City, MD (US); Russell Moriarty, Ellicott City, MD (US)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,995

(22) Filed: Sep. 4, 2023

(65) Prior Publication Data

US 2024/0348425 A1 Oct. 17, 2024

Related U.S. Application Data

(63) Continuation of application No. 18/134,642, filed on Apr. 14, 2023, now Pat. No. 11,750,371.

(51) Int. Cl.
*H04L 9/06* (2006.01)
*H04L 67/02* (2022.01)

(52) U.S. Cl.
CPC ............ *H04L 9/0643* (2013.01); *H04L 67/02* (2013.01)

(58) Field of Classification Search
CPC ............................. H04L 9/0643; H04L 67/02
See application file for complete search history.

(56) References Cited

U.S. PATENT DOCUMENTS

| 7,428,530 | B2 | 9/2008 | Ramarathnam et al. |
| 7,590,707 | B2 | 9/2009 | McCloy, III et al. |
| 7,870,608 | B2 | 1/2011 | Shraim et al. |
| 7,913,302 | B2 | 3/2011 | Shraim et al. |

(Continued)

OTHER PUBLICATIONS

Althouse et al. "JA3—A method for profiling SSL/TLS Clients". May 27, 2021. Retrieved from https://github.com/salesforce/ja3.

(Continued)

*Primary Examiner* — Chau Le
(74) *Attorney, Agent, or Firm* — WEITZMAN LAW OFFICES, LLC (57) ABSTRACT

A method for generating hashes associated with web domains and reacting to transmissions from those web domains is disclosed. When artifacts from a first web domain and artifacts from a second web domain have been transmitted over a network, a system generates, via a hashing or fingerprinting function that uses registry information, a first hash for the first web domain and a second hash for the second web domain and identifies a correlation between the first web domain and the second web domain based on shared subsets of the first hash and second hash. Upon receiving a notification that artifacts from the first web domain had been determined to negatively impact the functioning of a secondary computing system, based on the identified correlation between the first web domain and the second web domain, the system automatically quarantines artifacts from the second web domain from interacting with the secondary computing system.

20 Claims, 8 Drawing Sheets

(56) References Cited

U.S. PATENT DOCUMENTS

| | | | |
|---|---|---|---|
| 8,433,065 B2 | 4/2013 | Gentry | |
| 9,026,507 B2 | 5/2015 | Shraim et al. | |
| 9,130,837 B2 | 9/2015 | Bjarnason et al. | |
| 9,491,164 B1 | 11/2016 | Fay et al. | |
| 9,762,596 B2 | 9/2017 | Wang et al. | |
| 10,216,778 B2* | 2/2019 | Wang | G06F 16/951 |
| 11,032,297 B2 | 6/2021 | Xu et al. | |
| 11,271,966 B2 | 3/2022 | Prakash et al. | |
| 2010/0064042 A1* | 3/2010 | Paster | G06F 15/173 |
| | | | 709/225 |
| 2015/0074767 A1* | 3/2015 | Clark | H04L 63/0428 |
| | | | 726/4 |
| 2016/0065534 A1* | 3/2016 | Liu | G06F 16/951 |
| | | | 707/728 |
| 2017/0262651 A1* | 9/2017 | Kaliski, Jr. | H04L 61/4511 |
| 2018/0198819 A1 | 7/2018 | Lee et al. | |
| 2019/0014149 A1 | 1/2019 | Cleveland et al. | |
| 2019/0333054 A1 | 10/2019 | Cona et al. | |

OTHER PUBLICATIONS

Metcalf et al. "Correlating Domain Registrations and DNS First Activity in General and for Malware". Carnegie Mellon University Software Engineering Institute. Apr. 2011. Retrieved from https://resources.sei.cmu.edu/library/asset-view.cfm?assetid=57034.

\* cited by examiner

WEB DOMAIN CORRELATION HASHING METHOD

CROSS REFERENCE TO RELATED APPLICATION

This application is a continuation of and claims benefit to co-pending U.S. patent application Ser. No. 18/134,642, filed Apr. 14, 2023, and also titled "WEB DOMAIN CORRELATION HASHING METHOD", which is hereby incorporated by reference in its entirety.

FIELD OF INVENTION

This disclosure relates to use-case-specific hashing functions, and more specifically, to systems and methods for generating a hash that acts as a fingerprint for a particular web domain while also facilitating grouping of web domains to aid in malware identification by source domain.

BACKGROUND

In many computing contexts where content identification or deduplication are performed, it can be valuable to reduce a large data set into a more manageable form for storage, for transmission, or for sharing with others. Hashing functions or fingerprinting functions are a family of functions that perform this input reduction on various problem domains or file types, creating an implicit promise that two inputs with the same output hash are, if not identical, at least related in some way.

Although cryptographically secure hashing functions are useful in many contexts, some contexts make the property of avoiding collisions undesirable. For example, in the field of malware identification, software polymorphism or social engineering attacks may result in subtly different variations of attacks being stored in an antivirus or firewall system. Three emails with identical links to download a virus might be sent from the domains "malware.com", "malwar3.com", and "malware.org", and despite the human-intelligible similarity, the cryptographic hashes of these three emails would be completely different, if stored in a traditional hash table for deduplication. A fingerprinting function that preserves the bijection between input and output, but whose outputs are also related if inputs are related, may be preferable to a hashing function for which small changes in input produce wildly different outputs.

As the sophistication of attackers increases, variation in inputs will likely become more creative, and necessitate more sophisticated tools for automatically identifying that two particular inputs—one already known to be malicious and one whose status is unknown—have a correlation or relationship that is statistically unlikely to be the result of happenstance instead of a shared origin. Thus, there are advantages to developing methods to reduce the data storage associated with a web domain for greater manageability, but in a manner that preserves critical information for comparison and correlation of two or more web domains.

SUMMARY OF THE INVENTION

In order to address the limitations of previous systems in this field, new methods of web domain hashing/fingerprinting are disclosed in order to aid in identifying multiple web domains that are associated with one another—and, as a result, potentially share a quality of malice or benign-ness. New libraries, APIs, or other computing systems based on these methods can be used to enhance the functionality of existing anti-malware prevention systems such as firewalls, antiviruses, sandboxes, and quarantine/analysis systems in general.

The family of new hashing functions creates a representation of information associated with web domains' WHOIS information or other registry-related information (such as hosting information, Domain Name System information, Autonomous System Number information, GeoIP information, or any other publicly-accessible information related to the identity of or means of routing data to or means of accessing data from a given domain) that can be easily stored or shared with other anti-malware systems or entities. A concerned organization that has identified malware associated with a particular web domain is able to share these fingerprints or hashes of the web domain with other similarly concerned organizations. Consequently, they leverage each other's experience and knowledge and spread the news of a new malware vector more quickly. Further, the fingerprint or hash may obscure the data used to generate it, such that a source of malware identified by the fingerprint may be unaware that a publicly disclosed fingerprint identifies the source, and/or be unable to determine what information about the source was used to generate the fingerprint. As a result, it becomes harder for operators of web domains to merely change metadata about those domains in order to adapt and avoid detection.

Beyond merely identifying malicious web domains piecemeal and sharing that information with others, the family of hashing functions disclosed herein is intended to facilitate identification of other potentially-malicious web domains even before the first instance that they are used for a malicious purpose. Correlations between web domains' purposes can be inferred by relationships in their registry information, operating under an assumption that a person or entity that registers a first domain for a malicious or illegal purpose is more likely to have registered other domains for the same purpose. An automated system can iteratively compile a cluster or family of related domains, based at least in part on the correlations of fingerprints of those domains, at a speed and efficiency heretofore impossible. Using this information, an automated system can react to a particular member of the domain family in the first instance of interaction with that domain, before any artifact received from the particular member has been confirmed by experience or by analysis to be malicious. The system may allow for detection of previously difficult to detect patterns by being field-agnostic and being holistic in its data comparisons. Further, while being able to consider human expertise in some respects, a system can operate without consulting any human insight into which fields of a domain registration are important and which are not.

A computer-implemented method for generating hashes of registration information associated with web domains and reacting to artifacts electronically received from those web domains is disclosed. The method begins by receiving an indication that one or more artifacts from a first web domain and one or more artifacts from a second web domain have been transmitted from an external network towards a secondary computing system. A hashing function or fingerprinting function that receives as input registry information or other registry-related information generates a first domain correlation hash for the first web domain and a second domain correlation hash for the second web domain, the first domain correlation hash and second domain correlation hash each being concatenations of multiple subhashes, each subhash being a hash of a field derived from the registry information. A correlation is identified between the first web domain and the second web domain based at least in part on existence of a shared set of subhashes between the first domain correlation hash and second domain correlation hash. Upon receiving a notification that one or more artifacts from the first web domain had been determined to negatively impact the functioning of a secondary computing system, and based on the identified correlation between the first web domain and the second web domain, a computing system automatically acts to quarantine one or more artifacts from the second web domain from interacting with the secondary computing system.

Similarly, a system for generating hashes of web domains and reacting to artifacts electronically received from those web domains is disclosed. The system may include network taps or a source of network information, a server with access to the taps' input and to registry information, and any other processors or computing devices necessary to accomplish the method described above and to automatically quarantine one or more artifacts from a second web domain from interacting with a secondary computing system based on similarity of the second web domain to a first web domain.

Additional features include variations of the above method and system wherein

- a set of subhashes are themselves re-hashed to form a "hash of hashes", a single hash that not only minimizes the necessary bandwidth to share a database of hashes, but also further obfuscates domain correlation hashes from experimentation attacks to reverse engineer and defeat them;
- the computing system iteratively considers each web domain from a set of domains for correlation with the first web domain, based on a domain correlation hash for that web domain sharing a sufficient number of shared subhashes with the first domain correlation hash or with the second domain correlation hash;
- web domains are filtered out from consideration as having a possible correlation with the first web domain during each iteration of the iterative consideration based on an insufficient number of shared subhashes between the first domain correlation hash and domain correlation hashes for those web domains;
- web domains that are not filtered out from consideration because there was a sufficient number of shared subhashes between the first domain correlation hash and domain correlation hashes for those web domains are still determined not to correlate with the first web domain based on calculation of a weighted correlation value that weights matching of some subhashes differently from matching of other subhashes;
- the weighting is based at least in part on how prevalent a subhash is in the computed domain correlation hash for each web domain in the set of web domains; and/or
- at least one subhash is a truncated cryptographic hash of a data field (for example, SHA-256) which removes at least one byte from the cryptographic hash (for example, retaining only the last 64 bits).

BRIEF DESCRIPTION OF THE DRAWINGS

Other aspects, features and advantages will become more fully apparent from the following detailed description, the appended claims, and the accompanying drawings (provided solely for purposes of illustration without restricting the scope of any embodiment), of which:

DETAILED DESCRIPTION OF THE DRAWINGS

The presently disclosed web domain correlation hash system is intended to create a uniform format for representing WHOIS information or other registry-related information in a fingerprint that uniquely matches a particular web domain. The format also aids in the storage, comparison, and sharing of the fingerprints to aid in the identification of malicious web domains. The WHOIS protocol is a long-standing protocol for obtaining information about a web domain, its name servers, information about its registrar and registrant, and other status information about the domain. A variety of data fields may be extracted from this information or from other registry-related sources and used to create an n-gram of fields that uniquely identifies the domain and some of the most relevant information about its origins (from the perspective of identifying multiple domains with a shared malicious creator). Each field in the n-gram is hashed and concatenated to form a unique set of sub-hashes denoted as a "Domain Correlation Hash" ("DCH"). This set of sub-hashes may also be hashed itself to form a single "Domain Correlation Hash-of-Hashes" ("DCHH"). A DCH or DCHH can be shared with other entities to warn them of malicious actors without the actors necessarily knowing that a DCH or DCHH identifies their domains, or why. DCHs can also be used, according to methods described further below, to identify new malicious domains, based on correlations with existing malicious domains, before any malware from the new malicious domains have been encountered or analyzed.

Figure 1:
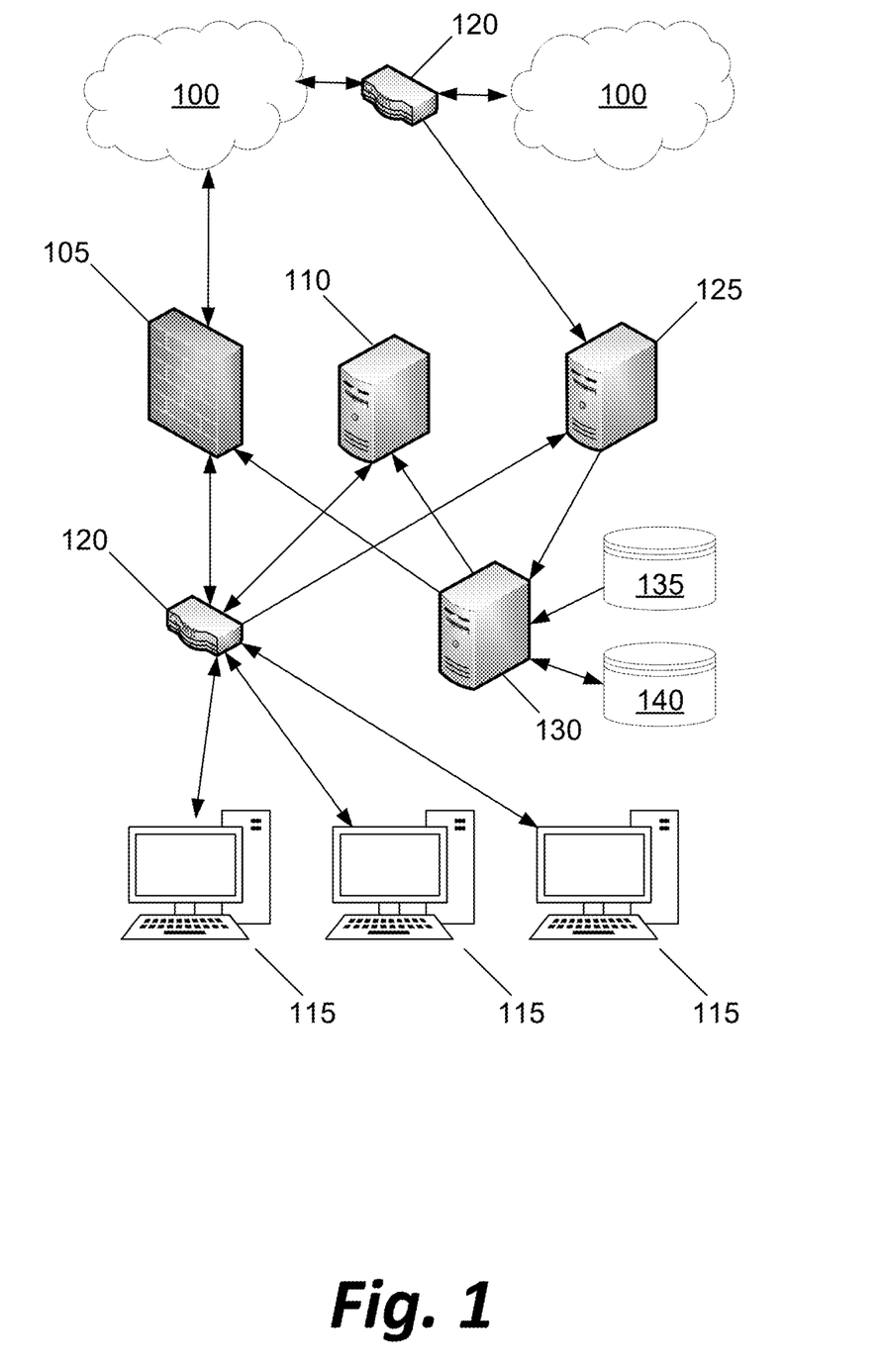
FIG. 1 depicts a possible system of computing devices used to examine artifacts transmitted over a network, generate hashes of web domains from which the artifacts originate, and act to prevent potentially malicious artifacts from being received or executed by other computing devices communicatively coupled to the network.

FIG. 1 illustrates, in simplified form, a system of computing devices used to examine artifacts transmitted over a network, generate hashes of web domains from which the artifacts originate, and act to prevent potentially malicious artifacts from being received or executed by other computing devices communicatively coupled to the network.

A network of computing devices may be operated by an organization such that they have some intercommunication with the Internet 100 or a similar external network through which malware tends to be transmitted freely. A firewall 105 may act as a defense against some malware by having blacklists set up for particular web domains or IP addresses.

A mail server 110 for the organization's domain may further act as a defense against some malware by rejecting email messages based on source domain, attachments, or other indicia of malice, and prevent the email clients of a number of client computing devices 115 from opening malicious emails. Ultimately, however, existing blacklists or heuristics may prove ineffectively in fully defending an organization's computing assets.

A number of network taps 120 may be operated externally or internally (that is, outside the firewall 105 or inside the firewall 105) in order to identify packets, files, emails, or other artifacts and catalogue information about them, including their source web domain. The network taps 120 may forward copies of such artifacts to an analysis sub-system 125. The analysis sub-system 125 may perform either static or sandboxed dynamic analysis in order to obtain a determination of the danger presented by the artifact being received by or executed by one of the client computing devices 115.

Figure 2:
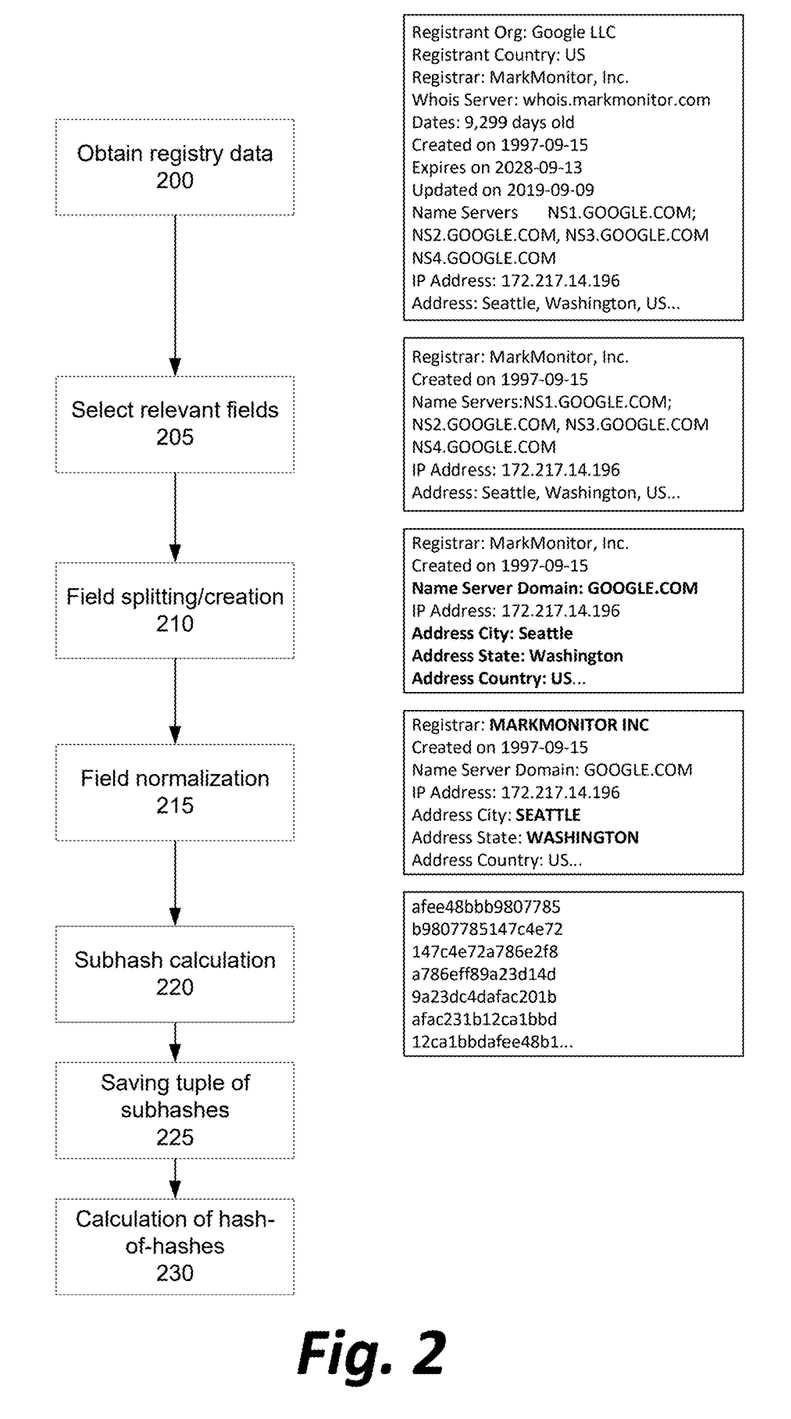
FIG. 2 depicts, in simplified flowchart form, a method of generating a domain correlation hash or domain correlation hash-of-hashes of a particular web domain.
Figure 3:
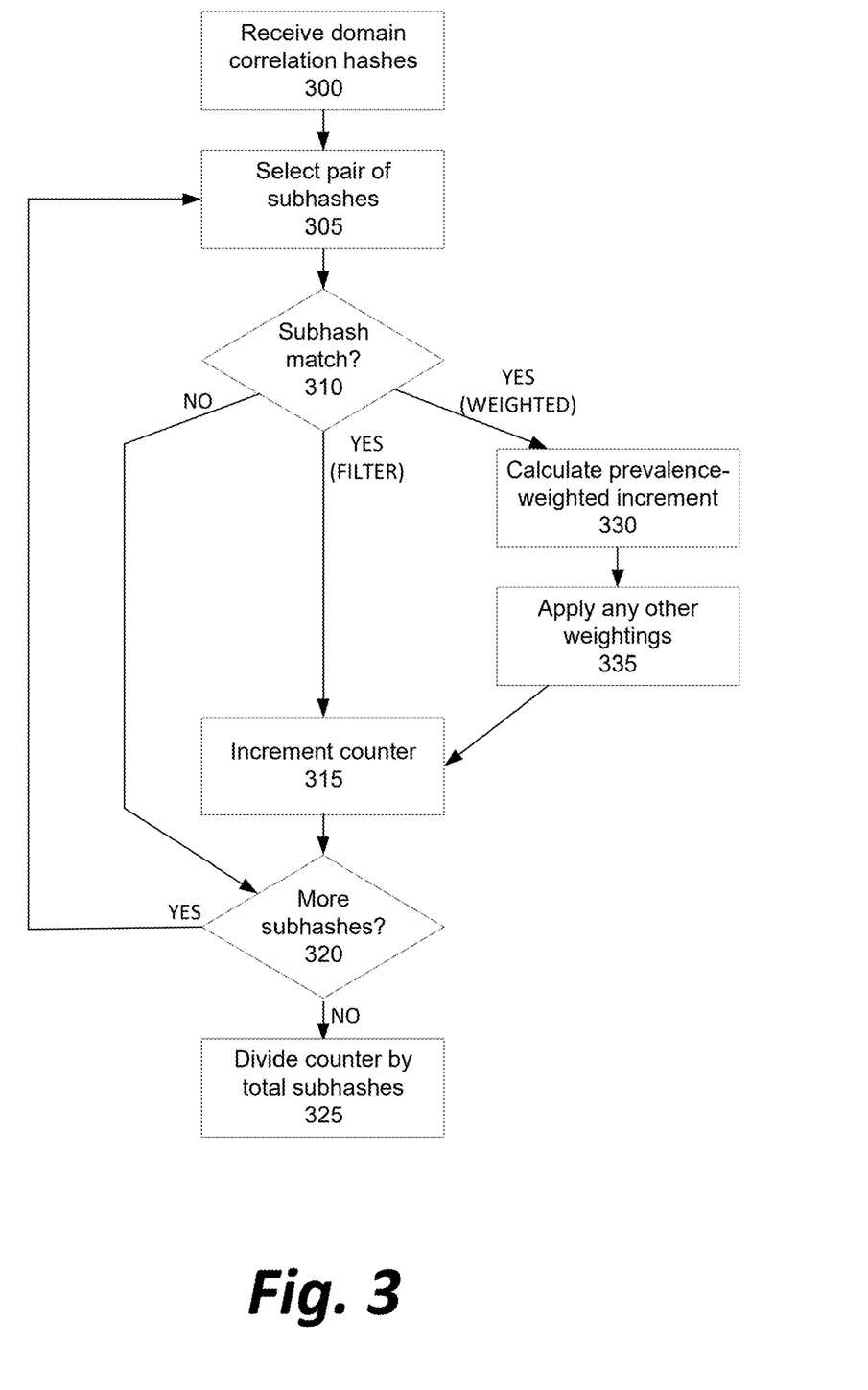
FIG. 3 depicts, in simplified flowchart form, a method of determining a level of correlation between two web domains based on their previously generated hashes.
Figure 4:
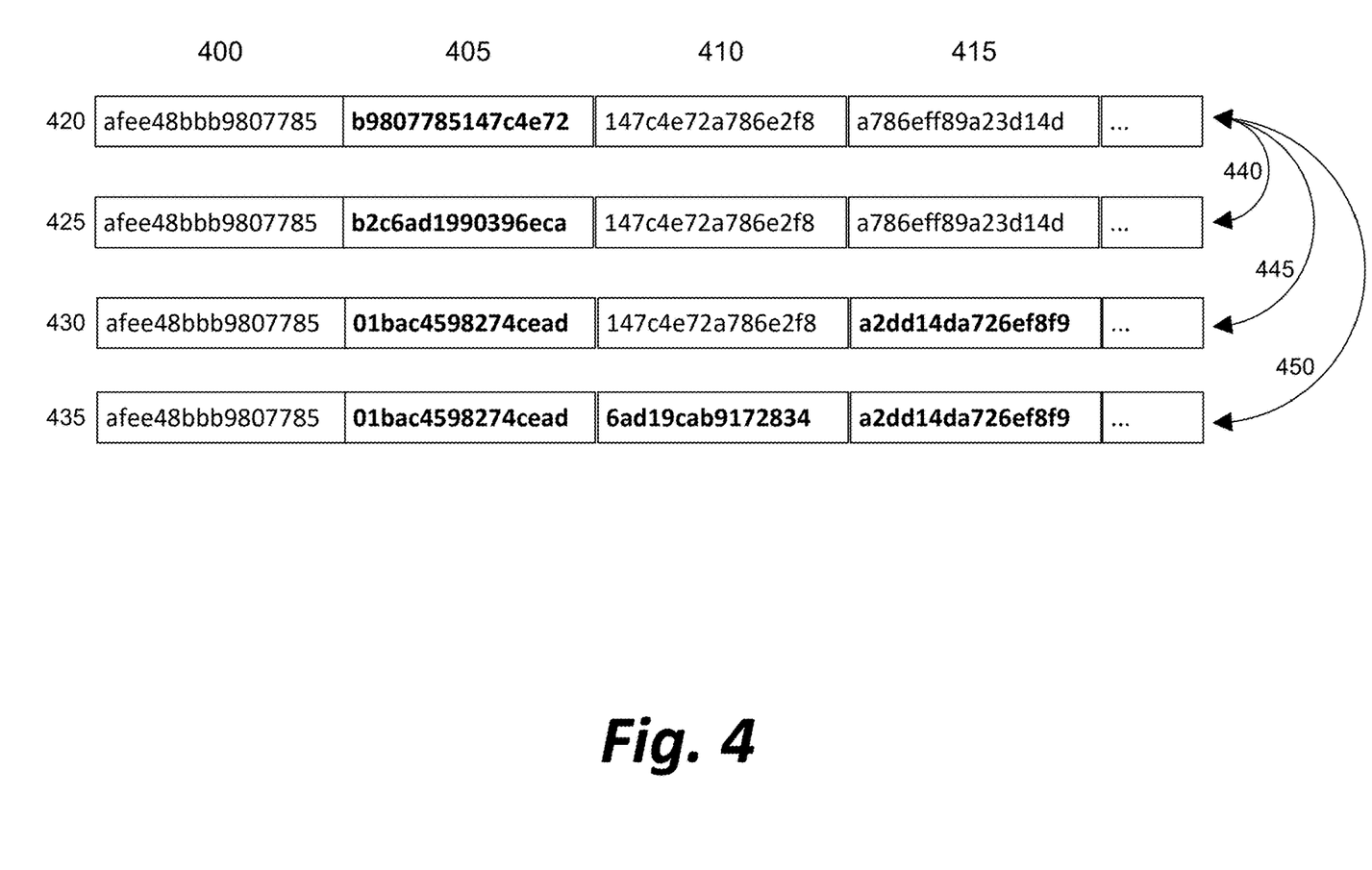
FIG. 4 depicts an example correlation determination between one domain and three other candidate domains.

When a potentially harmful artifact is identified, the web domain associated with the potentially harmful artifact is forwarded to the domain hashing and correlation sub-system 130. The domain hashing and correlation sub-system 130 will utilize information from a WHOIS server or other data cache 135 to generate a domain correlation hash or domain correlation hash-of-hashes, a fingerprint of the domain (as depicted in FIG. 2 and described further below in greater detail). These DCHs or DCHHs can further be used to identify a correlation between two web domains (as depicted in FIG. 3 and described further below in greater detail) and these correlations may be used further to identify, automatically and at scale, a large number of potentially malicious web domains (as depicted in FIG. 4 and described further below in greater detail) and store them in one or more databases 140 or other data stores. The contents of the database(s) 140 may be continually augmented with new identified correlations, and newly identified domains may be forwarded to the firewall 105 or the mail server 110 for future malware protection, or may be forwarded to external destinations to be used in other organizations' anti-malware efforts. The database(s) 140 may be, for example, a SQL-based database, data storage for files in another tabular format such as comma separated value text files, data storage for files in a non-tabular format such as XML or JSON, or any other means for storing records.

Although a particular division of functions between devices is described here, other configurations are possible in which functions are divided among devices differently. For example, all of the functions of some or all of the firewall 105, the mail server 110, network taps 120, analysis sub-system 125, domain hashing and correlation sub-system 130, WHOIS server or other data cache 135, and database(s) 140 might conceivably be performed by a single device with multiple threads executing different software modules simultaneously.

Alternatively, each system or device from among the firewall 105, the mail server 110, network taps 120, analysis sub-system 125, domain hashing and correlation sub-system 130, WHOIS server or other data cache 135, and database(s) 140 may in fact be a cluster of computing devices sharing functionality for concurrent processing. Further, although these various computing elements are described as if they are one computing device or cluster each, a cloud-based solution with multiple access points to similar systems that synchronize their data and are all available as backups to one another may be preferable in some embodiments to a unique set of computing devices all stored at one location. The specific number of computing devices and whether communication between them is network transmission between separate computing devices or accessing a local memory of a single computing device is not so important as the functionality that each part has in the overall scheme.

Hash Generation

As previously mentioned, the most important foundation of this disclosure is a method of hash generation upon which later parts of the disclosure will build.

FIG. 2 illustrates, in simplified flowchart form, a method of generating a domain correlation hash or domain correlation hash-of-hashes of a particular web domain.

First, WHOIS-related data or other registry-related data separate from the WHOIS protocol is obtained from a local source (if it has been cached and is available) or from an external source (Step 200). This may be accomplished by, for example, a query to a local database, a call to a particular API supplied by a website (such as "domaintools.com" or "ionos.com"), or any other data storage system from which records may be requested or retrieved. An example set of information that might be retrieved is depicted to the right of the flowchart, as well as potential changes to that information after each subsequent step is performed. As previously mentioned, other publicly-available registry information may be included instead of or in addition to WHOIS data, such as the identity or contact information or other attributes of the hosting service for a domain, the DNS registry for a domain, the ASN for a gateway to internal networks that are part of a domain, geographical location or Internet Service Provider or other information derived from GeoIP analysis of an IP address associated with the domain, and so on.

The WHOIS data or other retrieved data may contain a variety of unnecessary data fields. In a preferred embodiment, a set of 20-60 fields are designated as relevant and the remainder are omitted (Step 205). The decision of how many fields to include and which fields should be included can be tailored depending on how tolerant a particular application should be to false positive correlations or false negative correlations, whether the target of correlation is an organization or an individual, whether domains from other countries will be considered at all or only domains from a specific country with an expected address structure/telephone number structure/etc., or other situation-specific criteria.

In a preferred embodiment, some of the data fields may be split (Step 210) or otherwise undergo a transformation to create new fields before subsequent processing. For example, a data field that contains an email address, like "johndoe@example.com", may undergo splitting into an email account field and an email domain field. Other string or numeric data fields may be similarly split into a more significant and less significant portions. A telephone number may be split into its country code, area code, and local portion. An address may be split into a street number, street name, city name, political subdivision, mailing code, etc. A name server field may be split into a domain and subdomains (e.g., "ns1.example.com; ns2.example.com" might be split into "example.com" and "ns1;ns2"). An individual's name might be split into a given name and family name.

Further, some of the data fields may need to undergo a normalization step before use (Step 215). Strings with alphabetical characters may have all such characters converted to be uniformly uppercase or lowercase. Punctuation in telephone numbers, mailing addresses, email addresses, other strings, or other numbers may be removed, replaced with a uniform placeholder, or mapped to other specific values. Whitespace may be removed, trimmed, converted into other forms of whitespace. As a result, a malicious actor registering two domains will not be able to obscure the relationship between the domains by registering one with the address "123 Maple St." and the other with "123 maple st" (that is, varying the whitespace, capitalization, and presence of a period). Both may be normalized to some same value like "123 MAPLE ST" regardless of the input.

In a preferred embodiment, for each of the relevant, normalized data fields, a "subhash" is created (Step 220). In this preferred embodiment, the subhash is the result of using the SHA-256 function on the data field, but then truncating the output of the function and only using the last 64 bits in order to save on memory footprint and facilitate transmission of large numbers of these subhashes. Even though the risk of collisions is somewhat increased by truncation, it is not a critical feature that every possible collision of every subhash be avoided. Rather, a data correlation will only be assumed if a number of subhashes collide, and the probability of multiple collisions is still infinitesimal even when the cryptographic security of a hashing function is not fully utilized. Although the SHA-256 function is preferred, another cryptographically secure hash function may be selected, or even potentially one that is not cryptographically secure. Selections of subhash length and security may be tailored to particular use cases, to balance the likelihood of collision against the ease of computation of subhashes, memory needed to store the subhashes, and bandwidth needed to transmit the resulting sets of subhashes to others in a shared computing system.

A unique fingerprint for the given domain is created as an ordered tuple of all the modified subhashes (Step 225). This fingerprint can be shared with other entities along with a tag indicating malice, or other information, without analysis of the fingerprint being able to directly reveal from what domain the information was taken to generate it, or what value the domain has for any particular field. As previously mentioned, although this method is not unbreakably resistant to reverse engineering, this makes such a fingerprinting system much more robust against malicious actors reviewing the fingerprints and as easily determining how to avoid future domain registrations that will result in the same or similar fingerprints.

Optionally, a further step may be added to further obfuscate the subhashes from being obtained for reverse engineering, or to reduce the storage and bandwidth necessary for hashes. In this final step, the tuple of subhashes is itself hashed a final time to result in a domain correlation hash-of-hashes (Step 230). The hash-of-hashes may incorporate every subhash of the prior tuple, or may incorporate only a selected subset of the subhashes. Different use cases may require different choices; a hash of all subhashes is unlikely to be of value in identifying correlations (since a single subhash being different between two domains will result in a completely different hash-of-hashes and conceal the correlation) but a hash of fewer subhashes may lead to more false positives in correlation and lessen the value of a matching hash-of-hashes.

Hash Comparison

FIG. 3 illustrates, in simplified flowchart form, a method of determining a level of correlation between two web domains based on their previously generated domain correlation hashes.

In a relatively primitive embodiment, most suitable for filtering rather than a final correlation determination, a level of correlation might be determined by receiving a pair of domain correlation hashes for comparison (Step 300), and iteratively repeating a process of:

selecting a pair of associated subhashes from the two hashes (Step 305) (that is, selecting each hash's subhash for telephone number, each hash's subhash for email address, etc.);

if they match (Step 310), incrementing a counter (Step 315);

if more subhashes remain to be compared (Step 320), selecting a new pair of subhashes (back to Step 305); and if no more subhashes remain to be compared, dividing the total counter by the total number of subhashes that were compared to determine a correlation score (Step 325) between 0.0 and 1.0.

However, in a preferred embodiment, potentially different weightings are applied to each subhash comparison so that not every match increments a counter by 1, but rather increases the counter by a value between 0.0 and 1.0.

In this preferred embodiment, when two subhashes are equal (Step 310), a database storing all subhashes computed previously for all domains is also consulted for the prevalence of that subhash. If field splitting has occurred in the past for email addresses (see Step 210 in FIG. 2) or for telephone numbers, the subhashes that represent "gmail.com" or "+1" (for every United States number) may represent considerable portions for all subhashes of "email address domain" or "telephone number nation code." Incrementing the counter by 1 when such a match exists would imply that a match in nation or email provider is just as significant as a match in registrant's name or physical address.

In the preferred embodiment, the amount to increment is calculated (Step 330) by subtracting, from 1.0, the ratio of the number of times that a subhash occurs for a field and the total number of stored subhashes for that field. If 40% of all email addresses are from gmail.com, a match on email domain may only increment the value by 0.6; if 90% of all telephone numbers are from the United States, a match on telephone country code may only increment the value by 0.1. If a subhash is unique and is being seen for the first time, it will increment by the full 1.0; if a subhash has no explanatory value whatsoever, such as a subhash of a Boolean value that must be true for any active domain, it will increment by 0.0.

Alternative embodiments can be imagined to take prevalence into account for weighting in different ways, such as taking the square root or another exponent of the number computed above (to favor a value closer to 1.0 even when a subhash has some prevalence), applying another mathematical transformation to the prevalence, or not considering the magnitude of the prevalence—for example, if there are only five email providers in the dataset, count the match for 0.2 regardless of whether some email providers are more prevalent than others.

In addition to any calculations that take into account whether a particular subhash has been stored before, any other weighting factors may be custom created and applied (Step 335) for the needs of a particular use case. For example, knowing that an individual's name is more unique in general than a physical address, a match on name may increment the counter by 1.5 or 2.0 instead of 1.0.

Once a weighted value for the subhash match has been fully calculated, the counter is increased by the appropriate amount (back to Step 315), allowing for calculation of a more sophisticated weighted value once the final division by number of subhashes is performed.

FIG. 4 depicts a simplified example correlation determination between one domain and three other candidate domains.

Separate subhashes 400, 405, 410, 415 for three computed domain correlation hashes 420, 425, 430, 435 are depicted. In this example, the first DCH 420 corresponds to the DCH depicted being computed in FIG. 2. Subhashes are depicted in bold text when they differ from another subhashes in the same column.

In the example, each DCH has a value of "afee48bbb9807785" for the first subhash 400, indicating (in this example only) that all four domains use the registrar "MarkMonitor, Inc." (see FIG. 2) or conceivably another registrar that would have a hashing collision with that registrar. Each DCH has a different value for the second subhash 405, representing the date on which the domain was registered. Three of the DCHs share a same name server domain represented by the third subhash 410. Only two of the DCHs share a same IP address, represented by the fourth subhash 415.

When calculating correlation values 440, 445, 450 between pairs of domains, the initial, simplified comparison would show a correlation of 0.75 between the first and second domains based on their DCHs 420 and 425 sharing 3 out of 4 subhashes. The initial, simplified comparison would show a correlation of 0.5 between the first and third domains based on their DCHs 420 and 430 sharing 2 out of 4 subhashes. And, naturally, the initial, simplified comparison would show a correlation of 0.25 between the first and fourth domains based on their DCHs 420 and 435 sharing only 1 out of 4 subhashes.

The second, weighted comparison would rely on how prevalent each of the subhashes is in their shared storage. Because a shared IP address is much less likely than a shared registrar, and might only be shared by fewer than one in a million domains, the final correlation value for a shared IP address might be increased by almost a full 0.25 (1.0-0.000001, divided by the four subhashes being considered). In contrast, if 10% of all domains share a same registrar, such as "GoDaddy", the final correlation value for a shared registrar might only be increased by about 0.225 (1.0-0.1, divided by the four subhashes being considered).

The final correlations 440, 445, 450, once weighted properly, might ultimately be scored with something like 0.7499, 0.49, and 0.225 rather than the 0.75, 0.5, and 0.25 that would be suggested by subhash comparison without considering prevalence.

Importantly, even if a malicious actor has access to the contents depicted in FIG. 4 and desires to lower a correlation value by changing some aspect of domains under the actor's control, the actor may have difficulty determined which subhashes are associated with which data fields, and which subhashes are contributing the most to an elevated correlation value due to ignorance of the weighting scheme. As a result, the method of hashing is very robust against adaptive measures.

Bulk Correlation/Identification of Domains

Figure 5:
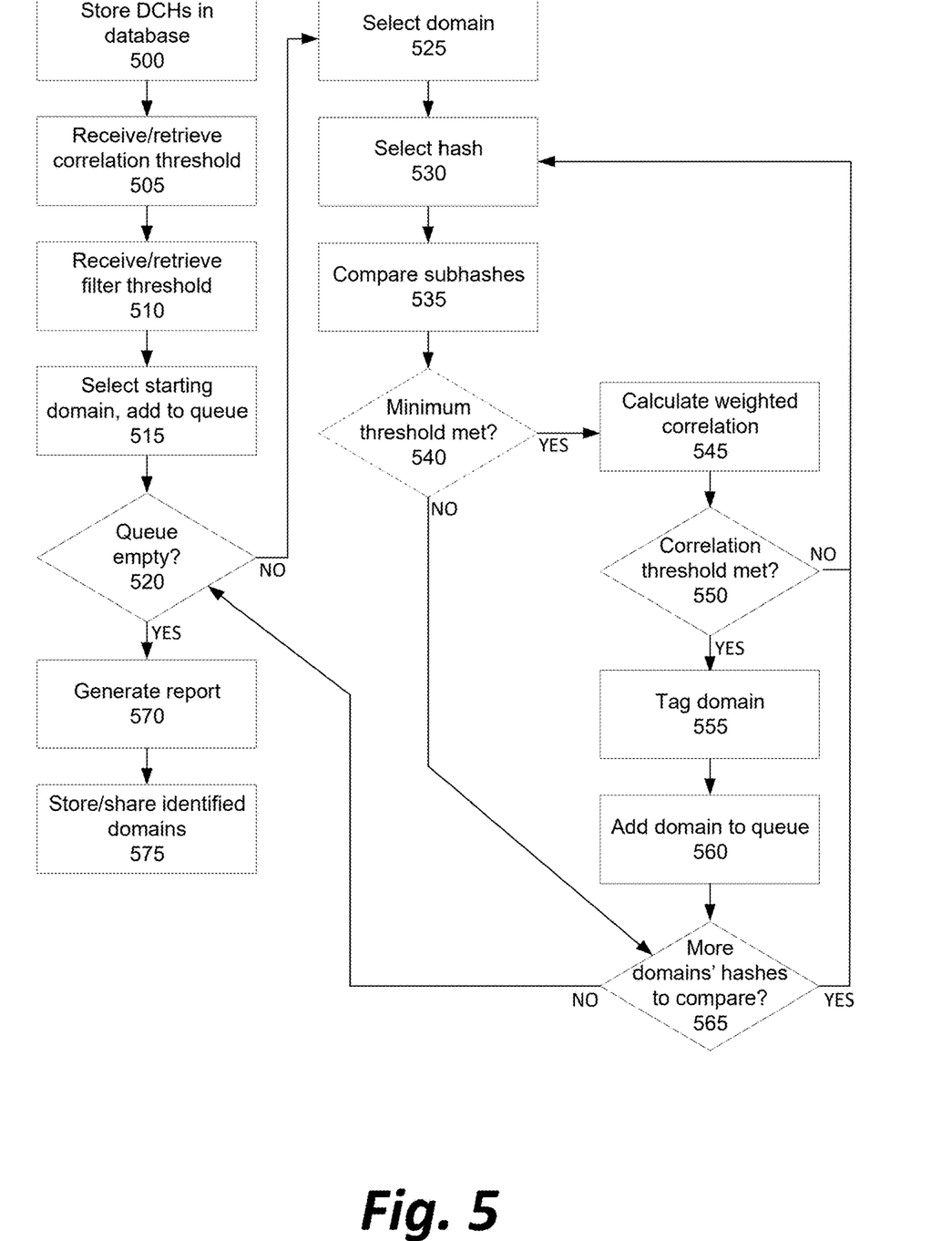
FIG. 5 depicts, in simplified flowchart form, a method of iteratively identifying new web domains to be added to a group.

FIG. 5 illustrates, in simplified flowchart form, a method of iteratively identifying new web domains to be added to a group.

First, a set of web domains each have their domain correlation hash calculated (see FIG. 2) and these hashes are stored, associated with the domain, in a database (Step 500). In a preferred embodiment, a Neo4j database may be used as the storage.

Next, a correlational threshold value is retrieved from memory or received from a user (Step 505). This might be explicitly set by a human user for a particular query to be conservative (requiring, for example, an 80% weighted match) or loose (requiring, for example, a 60% weighted match), or may select a default value from memory, or may calculate a value based on machine learning or other analysis of prior query false positives and false negatives, or use a same value as that which was used in the most recent query.

In a preferred embodiment, a minimum filtering threshold is retrieved, received, or calculated (Step 510) that concerns a required proportion of unweighted matches between subhashes instead of weighted matches. In a preferred embodiment, a default value of 50% unweighted matches of all subhashes is required. In other embodiments, a user may specify the value for a query, a previously used value may be retrieved, or it may be calculated as a function of the correlational threshold. The minimum filtering threshold acts as a first-pass filter to determine possible matches, to only compute the relatively expensive weighted matches when it is realistic that the weighted matches will exceed the correlational threshold.

A single domain is selected (Step 515) and added to a queue to act as the seed or root for a graph of correlated domains that may share a quality, such as malice.

If there are any domains in the queue (Step 520)—as there certainly will be after Step 515—the first domain is removed from the queue and designated as the current domain for pairwise comparison with others (Step 525).

For every domain correlation hash (Step 530) stored in the database, the subhashes of that DCH are preferably compared to the subhashes of the first domain's DCH (Step 535). If at least 50% (or whatever alternative minimum filtering threshold that is in effect) of the subhashes of the two DCHs match (Step 540), they are considered possibly correlated domains. This determination corresponds to the simplified branch of the flow depicted in FIG. 3. Although this step is preferred to short-circuit searches and minimize either the number of times a potentially costly weighting function will be executed or the size of a cache of prior weighting calculations, this step may be omitted in some embodiments or use cases.

If the domains are possibly correlated, the weighted correlation value is calculated (Step 545) (following the more sophisticated branch of the flow depicted in FIG. 3).

If the weighted correlation value is greater than or equal to the correlational threshold value (Step 550), the domains are considered correlated with one another. The second domain is tagged/stored with whatever indicator, such as malice, was considered to apply to the originally chosen domain (Step 555). The second domain is also added to the queue of domains (Step 560) for future iteration.

If not every domain has been compared to the currently selected domain (Step 565), a new one is selected for comparison to see if it meets the initial filtering step (back to Steps 530-540). If every domain has been compared to the currently selected domain, the queue is checked to see if any other domain can act as the basis for another iteration (back to Steps 520 and following). If such a domain exists, a new domain is selected as the basis for pairwise comparisons and the process iterates, possibly identifying additional domains that were not directly correlated with the original domain, but are correlated with another domain that was identified earlier in the loop.

If the queue is emptied without identification of any new domains to allow further iterations, the process terminates. In a preferred embodiment, each identified domain is compiled in a report (Step 570) that shows the domain, its level of correlation with another domain in the report, statistical data such as the standard deviation of all correlations and percentile score of that correlation compared to all correlations. If the correlations are being used to identify malicious actors, the identified domains are also stored in a database, transmitted to other security devices/software, or shared with other entities (Step 575) in order to enable security responses, as discussed further in relation to FIG. 7.

Figure 6:
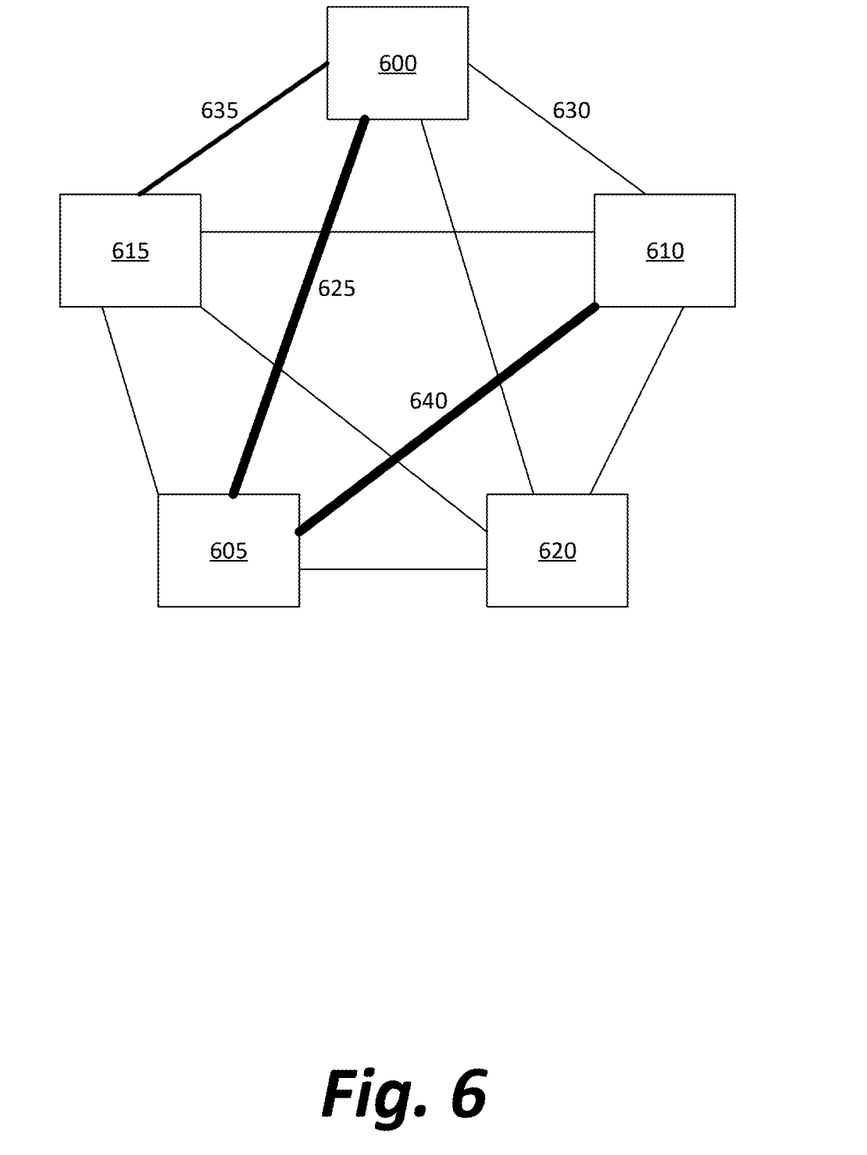
FIG. 6 depicts an example graph of domain correlations that might be identified through operation of the method depicted in FIG. 5.

FIG. 6 depicts an example graph of domain correlations that might be identified through operation of the method depicted in FIG. 5.

In this simplified example, there are only five domains 600, 605, 610, 615, 620 and various possible pairwise correlations 625, 630, 635, 640 between them. The thickness of the lines abstractly represents the number of shared subhashes between the domain correlation hashes of each of the lines' endpoints.

If a first domain 600 is identified as malicious, the other four domains may be checked for possible correlation with the first domain. Based on the pairwise comparison of subhashes between the first domain 600's hash and the second domain 605's hash exceeding 50% matches, and then the weighted comparison of these subhashes yielding a weighted score greater than the correlational threshold, the correlation 625 between the first and second domains may be established.

In contrast, the pairwise comparison of subhashes between the first domain 600's hash and the third domain 610's hash may fail to exceed 50% matches, not indicating a possible match on that basis. However, in a second iteration through all domains, using the second domain 605 as the basis of comparison, the pairwise comparison of subhashes between the second domain 605's hash and the third domain 610's hash may exceed 50% matches, and a correlation 640 between the two may be confirmed after the weighted correlation is calculated. As a result, the first domain 600 and the third domain 610 are identified as correlated with each other only indirectly, through the intermediary second domain 605, rather than by a direct pairwise correlation 630. Nevertheless, based on this indirectly identified correlation, communications associated with the third domain may be treated, in the future, similarly to communications associated with the first domain.

The pairwise comparison of subhashes between the first domain 600's hash and the fourth domain 615's hash may exceed 50% matches, but then the weighted comparison of these subhashes yields a weighted score less than the correlational threshold. In this case, a candidate pairwise correlation 635 that passed the filtering step fails to establish a correlation between the first domain 600 and the fourth domain 615.

In each of the other six possible pairwise correlations, less than 50% of subhashes match and no correlation is further investigated with the weighted calculation, nor ultimately established.

The two-tiered method of an initial filtering step and a more computationally expensive weighting step can result in dramatic efficiency gains. In this example, although ten pairwise comparisons are considered among the five examples, a weighted calculation need only be performed three times (for candidate correlations 625, 635, and 640) to identify the two final pairwise correlations, based on the filtering step removing domains quickly from consideration.

Testing Results on Actual Datasets

A human team spent six weeks creating a catalog of approximately 6,000 web domains associated with known malicious actors. The team then fed the elements into the iterative algorithm described above and depicted in FIGS. 5 and 6. Over an eighteen hour period, the method proceeded to examine the graph of possible correlations to a depth of three from each malicious domain (that is, every domain strongly correlated with a known malicious domain, every domain strongly correlated with those newly identified domains, and every domain strongly correlated with those domains), identifying a set of thousands of new domains. Over 5,000 of the newly identified domains were later verified to be malicious, despite lack of confirmation of any malicious activity at the time of execution. An accurate determination was possible based only on the inputs to the hashing function, on the hashing function preserving the necessary information while eliminating other irrelevant information, and on the iterative process accurately identifying web domains correlated with known existing malicious domains.

This method radically reduces the amount of human labor to be performed in anti-malware activities. It allows targeted investigation and putting preventative measures in place at the moment a web domain is registered, even before a single email, file, or other artifact has been received from that web domain by a possible victim. Further, as more and more data becomes available to such a system, its predictive strength becomes even stronger and malicious domains can be identified with greater sensitivity and greater accuracy.

Applications of Correlation

Figure 7:
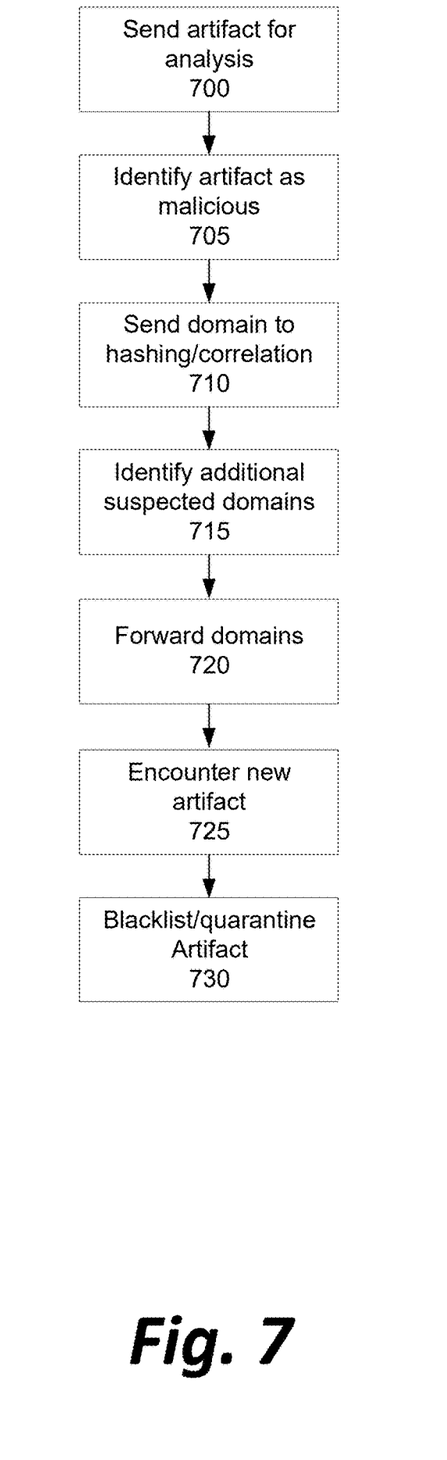
FIG. 7 depicts, in simplified flowchart form, a method of proactively responding to an artifact from a previously unseen source domain.

FIG. 7 illustrates, in simplified flowchart form, a method of proactively responding to an artifact from a previously unseen source domain.

Referring back to FIG. 1, upon a network tap 120 observing transmission of an artifact from a first domain, the network tap may send the artifact to the analysis sub-system 125 (Step 700). The analysis sub-system determines, using whatever static or dynamic analysis it performs, that the artifact is malicious (Step 705). The analysis sub-system notifies the domain hashing and correlation sub-system 130 and one or more databases 140 that the domain from which the artifact originated is likely malicious (Step 710). The domain hashing and correlation sub-system 130 performs the iterative method depicted in FIGS. 5 and 6 to identify additional domains that may be correlated with the web domain now believed to be malicious (Step 715). In response, at least one newly-identified malicious domain is transmitted to the firewall 105, mail server 110, or forwarded to other external destinations (Step 720) to be added to domain blacklists or similar data structures.

Upon the firewall 105, mail server 110, or other external destination encountering a new artifact originating from the second, newly-identified malicious domain (Step 725), an automatic blacklisting function is triggered (Step 730), preventing the new artifact from being accessed or executed by one of the client computing devices 115. This automatic prevention occurs even before any static or dynamic analysis of the artifact itself has occurred, and even before anything is known about the second web domain other than its correlation to the first web domain, without any need for human involvement to establish or justify a quarantine.

The action step 730 may be used for a variety of use cases, as necessary for an organization.

In a first embodiment, an email perimeter may be established for an organization, enforcing a quarantine at the mail server 110 of any emails originating from addresses at a particular newly-identified domain, or forwarded by mail servers from the particular domain. In response to identifying an email as having such a source or intermediate handler, the email may be diverted to a spam folder, be automatically deleted, have its attachments automatically deleted, have its hyperlinks be broken or converted to plaintext, have its hyperlinks display the target URL after the hyperlink, have text size, coloration, or fonts be standardized to avoid hidden or misleading content, be automatically quarantined into a storage not accessible by a human user's email client, be automatically flagged with a warning when opened by the human user's email client, or any other way of preventing a human user from inadvertently opening an attachment or following a link in an email that may have malware-related consequences.

In another embodiment, the firewall 105 or another routing device may be used to help prevent distributed denial of service ("DDOS") attacks on servers or client computers that are intended to be protected. In response to identifying a web domain as a source of denial of service attacks in the past, network packets originating from the particular newly-identified domain may automatically be dropped, time-delayed, forwarded to a different queue, or otherwise handled in such a way that they are not delivered immediately to their intended destination and are unable to interfere with a device's operation.

In yet another embodiment, files may be prevented from download to or execution by the client computing devices 115 by establishing a software-enforced sandbox into which all files from a particular domain must go. Downloads via web browser, downloads from a mapped network drive, downloads or uploads via FTP client, or any other means by which files might arrive over a network may be automatically shunted to the sandbox for quarantine and executed only while the sandbox prevents them from accomplishing any system damage. Even files not originating from a network, such as files from a USB drive, may be automatically quarantined based on metadata or contents of the files referencing a blacklisted domain.

Other embodiments can surely be imagined to take advantage of the knowledge that any sort of communication associated with a domain—whether in electronic file or mail format, or other communications methods such as physical mail, telephone calls, SMS, instant messages, etc. that might bear metadata or contents associated with the domain—might need to be treated differently from other communications in order to ensure security.

Computing Devices Generally

Although FIG. 1 depicts a preferred configuration of computing devices and software modules to accomplish the software-implemented methods described above, those methods do not inherently rely on the use of any particular specialized computing devices, as opposed to standard desktop computers and/or web servers. For the purpose of illustrating possible such computing devices, FIG. 8, below, describes various enabling devices and technologies related to the physical components and architectures described above.

Figure 8:
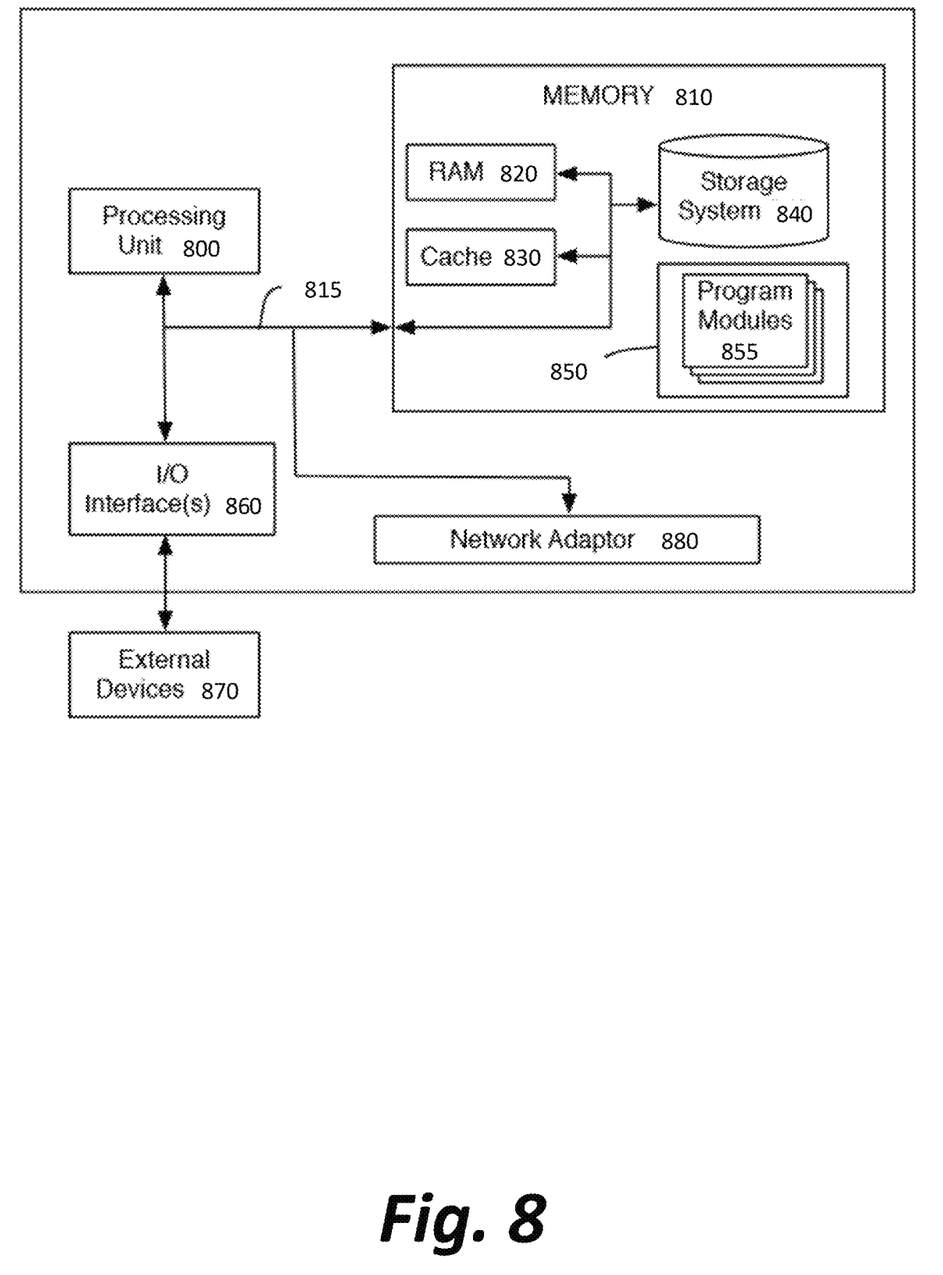
FIG. 8 is a high-level block diagram of a representative computing device that may be utilized to implement various features and processes described herein.

FIG. 8 is a high-level block diagram of a representative computing device that may be utilized to implement various features and processes described herein, for example, the functionality of the firewall 105, the mail server 110, client computing devices 115, network taps 120, analysis sub-system 125, domain hashing and correlation sub-system 130, WHOIS server or data cache 135, database(s) 140, or any other computing device described. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 8, the computing device is illustrated in the form of a special purpose computer system. The components of the computing device may include (but are not limited to) one or more processors or processing units 800, a system memory 810, and a bus 815 that couples various system components including memory 810 to processor 800.

Bus 815 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 800 may execute computer programs stored in memory 810. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 800 may be used.

The computing device typically includes a variety of computer system readable media. Such media may be any available media that is accessible by the computing device, and it includes both volatile and non-volatile media, removable and non-removable media.

System memory 810 can include computer system readable media in the form of volatile memory, such as random access memory (RAM) 820 and/or cache memory 830. The computing device may further include other removable/non-removable, volatile/non-volatile computer system storage media. By way of example only, storage system 840 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 815 by one or more data media interfaces. As will be further depicted and described below, memory 810 may include at least one program product having a set (e.g., at least one) of program modules that are configured to carry out the functions of embodiments described in this disclosure.

Program/utility 850, having a set (at least one) of program modules 855, may be stored in memory 810 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 870 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 860.

In addition, as described above, the computing device can communicate with one or more networks, such as a local area network (LAN), a general wide area network (WAN) and/or a public network (e.g., the Internet) via network adaptor 880. As depicted, network adaptor 880 communicates with other components of the computing device via bus 815. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for generating hashes of registration information associated with web domains and reacting to artifacts electronically received from those web domains, comprising:
    a correlating server;
    one or more processors; and
    non-transitory memory storing instructions that, when executed by the one or more processors, cause the one or more processors to:
    receive a query identifying a first web domain;
    generate, via a hashing function or fingerprinting function that receives as input registry information including one or more of WHOIS information, hosting information, and routing information, a first domain correlation hash for the first web domain and a second domain correlation hash for a second web domain, the first domain correlation hash and second domain correlation hash each being tuples of multiple subhashes, each subhash being a hash of a field derived from the registry information; and
    identify a correlation between the first web domain and the second web domain based at least in part on existence of a shared set of subhashes between the first domain correlation hash and the second domain correlation hash.

2. The system of claim 1, wherein the instructions, when executed by the one or more processors, further cause the one or more processors to:
    receive a set of web domains for possible correlation with the first web domain;
    compute a domain correlation hash for each web domain in the set of web domains, each correlation hash being a tuple of multiple subhashes, each subhash being a hash of a field derived from the registry information;
    iteratively consider each web domain from the set of domains for correlation with the first web domain, based on a domain correlation hash for that web domain sharing a sufficient number of shared subhashes with the first domain correlation hash or with the second domain correlation hash; and
    identify a third web domain that correlates with the first web domain based at least in part on its third domain correlation hash sharing the sufficient number of shared subhashes with the first domain correlation hash or with the second domain correlation hash.

3. The system of claim 2, wherein the third web domain has an identified correlation with the second web domain based on the sufficient number of shared subhashes between the second domain correlation hash and the third domain correlation hash, and the second web domain has an identified correlation with the first web domain based on the sufficient number of shared subhashes between the second domain correlation hash and the first domain correlation hash, but the third domain correlation hash lacks the sufficient number of shared subhashes with the first domain correlation hash.

4. The system of claim 2, wherein a fourth web domain is filtered out from consideration as having a possible correlation with the first web domain during each iteration of the iterative consideration based on an insufficient number of shared subhashes between the first domain correlation hash and a fourth domain correlation hash for the fourth web domain.

5. The system of claim 4, wherein a fifth web domain that was not filtered out from consideration because there was a sufficient number of shared subhashes between the first domain correlation hash and a fifth domain correlation hash for the fifth web domain is determined not to correlate with the first web domain based on calculation of a weighted correlation value that weights matching of some subhashes differently from matching of other subhashes.

6. The system of claim 5, wherein the weighting is based at least in part on how prevalent a subhash is in the computed domain correlation hash for each web domain in the set of web domains.

7. The system of claim 1, wherein the identified correlation between the first web domain and the second web domain is further based at least in part on a weighted correlation value that weights matching of some subhashes differently from matching of other subhashes.

8. The system of claim 7, wherein the weighting is based at least in part on how prevalent a subhash is in a data store of computed domain correlation hashes.

9. The system of claim 1, wherein the instructions, when executed by the one or more processors, further cause the one or more processors to:
    select one or more subhashes from the domain correlation hash; and
    calculate a domain correlation hash-of-hashes based at least in part on a cryptographic hash of the selected one or more subhashes.

10. The system of claim 1, further comprising
    a firewall or other intermediary server between a secondary computing system and an external network;
    wherein the instructions, when executed by the one or more processors, further cause the one or more processors to:
    receive a notification that a prior one or more artifacts from the first web domain had been determined to negatively impact the functioning of the secondary computing system; and
    based on the identified correlation between the first web domain and the second web domain, proactively protect the functioning of the secondary computing system by automatically quarantining a present one or more artifacts from the second web domain at the firewall or other intermediary server before the present one or more artifacts can pass from the external network to the secondary computing system.

11. A computer-implemented method for generating hashes of registration information associated with web domains and reacting to artifacts electronically received from those web domains, comprising:
    receiving an indication that one or more artifacts from a first web domain and one or more artifacts from a second web domain have been transmitted from an external network towards a secondary computing system;

generating, via a hashing function or fingerprinting function that receives as input registry information including one or more of WHOIS information, hosting information, and routing information, a first domain correlation hash for the first web domain and a second domain correlation hash for the second web domain, the first domain correlation hash and second domain correlation hash each being tuples of multiple subhashes, each subhash being a hash of a field derived from the registry information; and identifying a correlation between the first web domain and the second web domain based at least in part on existence of a shared set of subhashes between the first domain correlation hash and the second domain correlation hash.

12. The method of claim 11, further comprising:
receiving a set of web domains for possible correlation with the first web domain;
computing a domain correlation hash for each web domain in the set of web domains, each correlation hash being a tuple of multiple subhashes, each subhash being a hash of a field derived from the registry information;
iteratively considering each web domain from the set of domains for correlation with the first web domain, based on a domain correlation hash for that web domain sharing the sufficient number of shared subhashes with the first domain correlation hash or with the second domain correlation hash;
identifying a third web domain that correlates with the first web domain based at least in part on its third domain correlation hash sharing a sufficient number of shared subhashes with the first domain correlation hash or with the second domain correlation hash.

13. The method of claim 12, wherein the third web domain has an identified correlation with the second web domain based on the sufficient number of shared subhashes between the second domain correlation hash and the third domain correlation hash, and the second web domain has an identified correlation with the first web domain based on the sufficient number of shared subhashes between the second and first domain correlation hashes, but the third domain correlation hash lacks the sufficient number of shared subhashes with the first domain correlation hash.

14. The method of claim 12, wherein a fourth web domain is filtered out from consideration as having a possible correlation with the first web domain during each iteration of the iterative consideration based on an insufficient number of shared subhashes between the first domain correlation hash and a fourth domain correlation hash for the fourth web domain.

15. The method of claim 14, wherein a fifth web domain that was not filtered out from consideration because there was a sufficient number of shared subhashes between the first domain correlation hash and a fifth domain correlation hash for the fifth web domain is determined not to correlate with the first web domain based on calculation of a weighted correlation value that weights matching of some subhashes differently from matching of other subhashes.

16. The method of claim 15, wherein the weighting is based at least in part on how prevalent a subhash is in the computed domain correlation hash for each web domain in the set of web domains.

17. The method of claim 11, wherein the identified correlation between the first web domain and the second web domain is further based at least in part on a weighted correlation value that weights matching of some subhashes differently from matching of other subhashes.

18. The method of claim 17, wherein the weighting is based at least in part on how prevalent a subhash is in a data store of computed domain correlation hashes.

19. The method of claim 11, further comprising:
selecting one or more subhashes from the domain correlation hash; and
calculating a domain correlation hash-of-hashes based at least in part on a cryptographic hash of the selected one or more subhashes.

20. The method of claim 19, wherein the domain correlation hash-of-hashes is based at least in part on a cryptographic hash of all subhashes from the domain correlation hash.

* * * * *